US 12,095,329 B2

United States Patent
Shimizu et al.

(10) Patent No.: US 12,095,329 B2
(45) Date of Patent: Sep. 17, 2024

(54) MOTOR ARMATURE WINDING STRUCTURE AND MOTOR ARMATURE WIRE WINDING METHOD

(71) Applicant: SANYO DENKI CO., LTD., Tokyo (JP)

(72) Inventors: Mai Shimizu, Tokyo (JP); Takashi Matsushita, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 300 days.

(21) Appl. No.: 17/669,494

(22) Filed: Feb. 11, 2022

(65) Prior Publication Data
US 2022/0263375 A1    Aug. 18, 2022

(30) Foreign Application Priority Data

Feb. 16, 2021  (JP) .................................. 2021-022561

(51) Int. Cl.
| | | |
|---|---|---|
| H02K 3/34 | (2006.01) | |
| H02K 3/30 | (2006.01) | |
| H02K 3/52 | (2006.01) | |
| H02K 15/095 | (2006.01) | |
| H02K 21/14 | (2006.01) | |

(52) U.S. Cl.
CPC ............... H02K 3/522 (2013.01); H02K 3/34 (2013.01); H02K 15/095 (2013.01); H02K 21/14 (2013.01)

(58) Field of Classification Search
CPC ............. H02K 3/46; H02K 3/34; H02K 3/522
USPC ........................................................ 310/194
See application file for complete search history.

(56) References Cited

U.S. PATENT DOCUMENTS

| | | | | |
|---|---|---|---|---|
| 6,590,310 B2 * | 7/2003 | Takano | ................ | H04N 1/0315 |
| | | | | 310/216.074 |
| 7,200,917 B2 | 4/2007 | Takano et al. | | |
| 8,222,790 B2 | 7/2012 | Sakata | | |
| 8,513,851 B2 * | 8/2013 | Tsukamoto | ......... | F04C 29/0085 |
| | | | | 310/215 |
| 9,088,191 B2 * | 7/2015 | Yokogawa | ............. | H02K 3/345 |
| 9,118,234 B2 * | 8/2015 | Tsukamoto | ............ | H02K 15/12 |
| 9,172,289 B2 * | 10/2015 | Kreidler | ................ | H02K 15/00 |
| 9,397,527 B2 * | 7/2016 | Haga | ........................ | H02K 3/18 |
| 9,444,300 B2 * | 9/2016 | Shijo | ...................... | H02K 3/522 |

(Continued)

FOREIGN PATENT DOCUMENTS

| | | |
|---|---|---|
| EP | 2071706 A1 | 6/2009 |
| JP | 2002-272045 A | 9/2002 |

(Continued)

OTHER PUBLICATIONS

Morishima JP 5709461 English MachineTranslation (Year: 2013).*

(Continued)

*Primary Examiner* — Burton S Mullins
(74) *Attorney, Agent, or Firm* — RANKIN, HILL & CLARK LLP

(57) ABSTRACT

There is provided a motor armature winding structure that includes a filleted portion including a curved surface, the filleted portion is formed on at least one of corner portions at four corners of a bobbin side wall surface where a wire is wound, and the curved surface has a curvature radius that decreases from a winding start position toward a winding end position in a first layer of the wires wound on the bobbin side wall surface.

4 Claims, 9 Drawing Sheets

(56) References Cited

U.S. PATENT DOCUMENTS

| | | |
|---|---|---|
| 9,601,959 B2 | 3/2017 | Shirai et al. |
| 9,768,657 B2 * | 9/2017 | Ogawa .................. H02K 3/522 |
| 10,903,708 B2 * | 1/2021 | Honda .................. H02K 3/345 |
| 2010/0026117 A1 | 2/2010 | Sakata |

FOREIGN PATENT DOCUMENTS

| | | | |
|---|---|---|---|
| JP | 4655764 B2 | 3/2011 | |
| JP | 2012-95492 A | 5/2012 | |
| JP | 2014-075929 | 4/2014 | |
| JP | 5709461 B2 * | 4/2015 | ............... H02K 3/34 |
| JP | 2016-021822 | 2/2016 | |
| JP | 2017-093115 | 5/2017 | |
| JP | 2018-137926 | 8/2018 | |
| JP | 2018-137929 A | 8/2018 | |

OTHER PUBLICATIONS

Extended European Search Report (EESR) dated Jul. 20, 2022 for European Patent Application No. 22156179.8.

Japanese Office Action mailed Feb. 22, 2022 for Japanese Patent Application No. 2021-022561; English machine translation.

Japanese Office Action mailed Jun. 7, 2022 for Japanese Patent Application No. 2021-022561; English machine translation.

* cited by examiner

MOTOR ARMATURE WINDING STRUCTURE AND MOTOR ARMATURE WIRE WINDING METHOD

CROSS-REFERENCE TO RELATED APPLICATION

This application is based on Japanese Patent Application No. 2021-022561 filed with the Japan Patent Office on Feb. 16, 2021, the entire content of which is hereby incorporated by reference.

BACKGROUND

1. Technical Field

The present disclosure relates to a motor armature winding structure and a motor armature wire winding method.

2. Related Art

Winding more turns of electric wire around a bobbin of a motor and improving the fill factor of the winding contribute to improvements in the performance and efficiency of the motor. Hence, the number of turns in the winding is considered at the design stage of an armature. Generally, an armature is designed to fit a predetermined number of electric wires wound around a bobbin, into a space in a slot.

However, in many cases, the overall size of a coil into which electric wire is wound increases more than expected at the manufacturing stage. As a result, the coil may interfere with an armature core or an adjacent coil, and hinder the motor assembly work. Moreover, a ground fault may occur due to failing to maintain insulation.

The above cases have various causes. One of the causes is that each single wire cannot be fitted at a position allocated thereto at the design stage. In this case, the wires that are placed incorrectly and overlap each other are wound into a coil that bulges more than expected.

In order to encourage improvements in the performance and efficiency of the motor, it is necessary to fit a wire at a designed position. In order to achieve this, it is necessary to improve wire alignment.

SUMMARY

A motor armature winding structure according to an embodiment of the present disclosure is for winding an armature wire around a bobbin of a motor, and includes a filleted portion including a curved surface. The filleted portion is formed on at least one of corer portions at four corners of a bobbin side wall surface where the wire is wound, and the curved surface has a curvature radius that decreases from a winding start position toward a winding end position in a first layer of the wires wound on the bobbin side wall surface.

BRIEF DESCRIPTION OF DRAWINGS

FIG. 5A is a side view of the bobbin, and FIG. 5B is an enlarged perspective view of the bobbin;

FIG. 10A is a general view, and FIGS. 10B to 10F are enlarged views of an end portion.

DETAILED DESCRIPTION

Figure 1A:
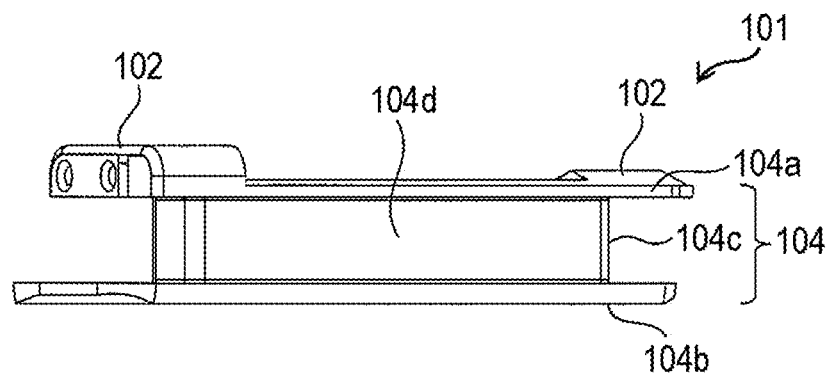
FIG. 1A is a general external view of a typical bobbin.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
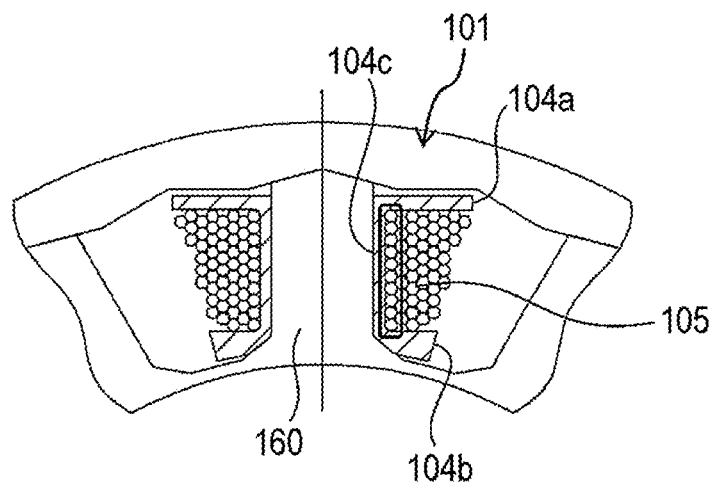
FIG. 1B is a cross-sectional view of the bobbin including a radial direction perpendicular to the axis, which illustrates wires wound on a pole of an armature core of a motor via an insulator (refer to JP-A-2002-272045)

FIGS. 1A and 1B illustrate a general external view of a typical bobbin (FIG. 1A), and a cross-sectional view of wires (FIG. 1B) (refer to JP-A-2002-272045). A wire 105 is wound around a structure called a bobbin 101, or a structure called an insulator 104 obtained by splitting the bobbin 101 into two parts in the axial direction, in FIG. 1A. The insulator 104 is for insulation. Hence, the insulator 104 is made of mainly an insulating material such as polymer resin. The insulator 104 including a winding portion where the wire is wound includes an upper surface portion 104a, a lower surface portion 104b, side surface portions 104c, and side surface portions 104d. A cross section of the insulator 104 has an angular U shape. The winding portion is provided to all the areas of the insulator 104 where the wire is wound. The side surface portion 104c indicates a lateral portion of the side surface portions. The side surface portion 104d indicates a longitudinal portion of the side surface portions. The former may be particularly referred to as the side end portion 104c. A part including the side end portion 104c is provided with a flange portion 102 that extends further out than the side end portion 104c on each of opposite sides in the longitudinal direction. The wire winding direction is changed by use of the flange portion 102. Moreover, the flange portion 102 is also a portion that draws in the start wire, or draws out the end wire. As a whole, the smooth winding and drawing in/out of the wire encourage preventing the wire from coming off and being displaced during winding.

FIG. 1B is a cross-sectional view in a radial direction relative to the axis. FIG. 1B illustrates the wires 105 wound around a pole 160 of an armature core of a motor via the insulator 104.

As illustrated in FIG. 1B, the wires 105 that are wound and aligned in a straight line around the pole 160 via the insulator 104 are drawn at the winding design stage. In this manner, the number of turns is considered. However, as described above, the wires 105 lose their alignment in reality.

The wires 105 should be ideally aligned as in wires illustrated in the area inside the thick lines in FIG. 1B (which are assumed to be the first layer). However, in reality a predetermined number of the wires 105 may not be aligned in the first layer of the wire 105 that starts being wound at a winding start position on the insulator 104. In this for example, the wire 105 may accidentally slide up to the second layer against the drawing intent in the step of winding the wire 105 in the first layer from the winding start position to a winding end position on the insulator 104, which is the main cause of the loss of alignment of the wires 105.

An unillustrated tip component (called a nozzle of a winding machine) that feeds an electric wire from the tip moves up and down in accordance with a winding program to feed the electric wire. For example, the shift of the position of the nozzle is predetermined by the winding program. The insulator 104 is placed on a rotary shaft provided at a predetermined position relative to the nozzle of the winding machine. The wire 105 is then wound around the rotating insulator 104, that is, bobbin. At this point in time, theoretically the wire to be wound is placed at a predetermined position. As a result, the wires 105 are aligned in a straight line on the surface of the side end portion 104c of the insulator as illustrated in FIG. 1B. However, the relative position between the nozzle and the bobbin may be shifted due to, for example, an error in the initial position of the winding machine, an error in the dimension of the bobbin itself, or an error in the dimension of the insulator itself. Consequently, the feed position of each wire in the first layer is shifted by the order of several hundred to several ten µm. Such an event prevents obtaining an ideal arrangement in the first layer as in FIG. 1B. As a result, the arrangement of the wires in the first layer loses its alignment.

In the most stable winding form, the wires 105 in the second layer are wound into an arrangement called "orthocyclic winding". In this arrangement, the wires 105 in the second layer are wound in such a manner as to fit in groove portions formed between the adjacent wires 105 having a circular cross section in the first layer. Therefore, unless there is loss of alignment of the wires in the first layer, the wires in the second layer are also wound into the orthocyclic winding arrangement. In other words, the groove portion formed by the wires in the first layer acts as a guide to enable stable positioning. The wire is similarly and stably wound in the subsequent layers. However, if the wires in the first layer lose their alignment, wires in the second and subsequent layers also lose their alignment. The alignment loss is accumulated from layer to layer up to the final layer, which results in a severe harmful effect in winding, that is, the bulging of the winding due to the alignment loss.

Figure 2A:
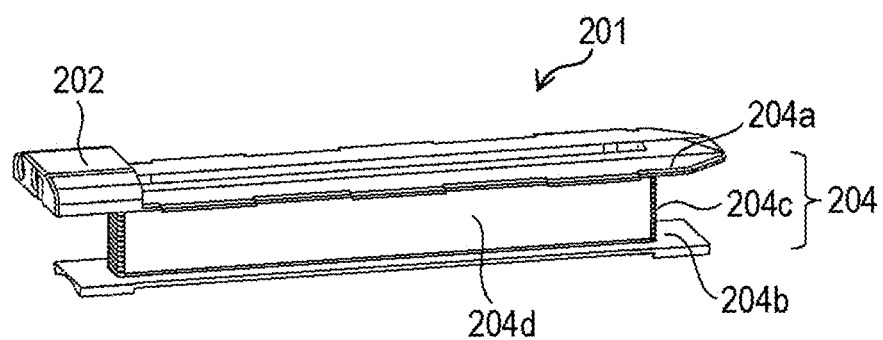
FIGS. 2A and 2B are diagrams illustrating an example of the configuration of a grooved bobbin (improved from FIG. 1A)
Figure 2B:
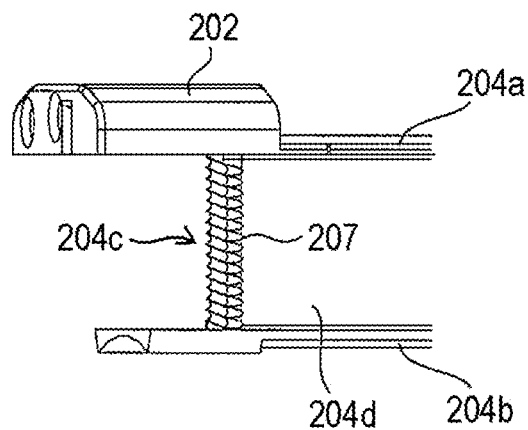

FIGS. 2A and 2B illustrate an example of the configuration of an improved grooved bobbin as a measure to mitigate the above bulging phenomenon of the winding. The reference numerals of members corresponding to FIGS. 1A and 1B are presented with numbers obtained by adding 100 to the numbers of the reference numerals of the members in FIGS. 1A and 1B. These reference numerals indicate correspondences between the members of both bobbins.

The grooved bobbin in the general view in FIG. 2A has an external appearance similar to that of the bobbin in FIG. 1A. However, as illustrated in FIG. 2B, many groove portions 207 are formed in a side end portion 204c between flange portions 204a and 204b on a bobbin 201. An upper part of the groove portion 207 is open to let the wire in. Moreover, a bottom part of the groove portion 207 has a substantially arc shape where the wire fits. Various specifications such as the width of the bottom part are appropriately set according to, for example, the diameter of the wire in such a manner that the wire can tightly fit on the bottom part. As long as the purpose is achieved, the shape can be selected as desired. According to such a configuration, the wires in the first layer fit in the groove portions and aligned in a straight line. Therefore, the wires in the first layer are ensured to be placed at predetermined positions. Hence, all the wires including those in the second and subsequently layers are stably aligned.

Such an improvement example is highly reliable in terms of an improvement in alignment. However, various specifications such as the width of the bottom part of the groove portion 207 are dependent on the wire shape such as the diameter of the wire as described above. Hence, for example, when wires having different wire diameters are wound around bobbins 210, it is necessary to provide the bobbin 210 suitable for the diameter of the wire. Hence, it is necessary to provide as many bobbins as variations in wire diameters.

This invites various problems including an increase in the cost of a mold for resin molding that is used to manufacture bobbins, complexity of stock management, and a reduction in productivity. In general electric design, for example, the motor armature winding is customized according to the different drive condition in power supply voltage or power supply current capacity. In this manner, for example, the diameter of the wire is optimized after trial and error in terms of design. When this is considered, the above various problems lead to serious adverse effects.

Figure 3A:
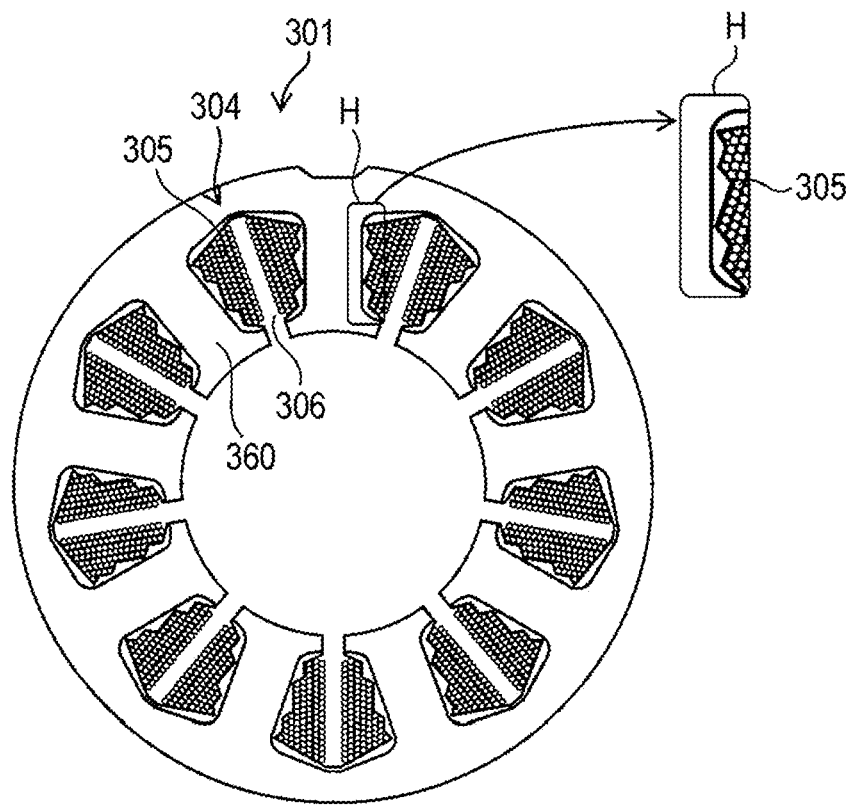
FIGS. 3A and 3B are diagrams illustrating another example improved from FIG. 1A, in which a side surface of the insulator on which the wire is wound has projections and depressions.
Figure 3B:
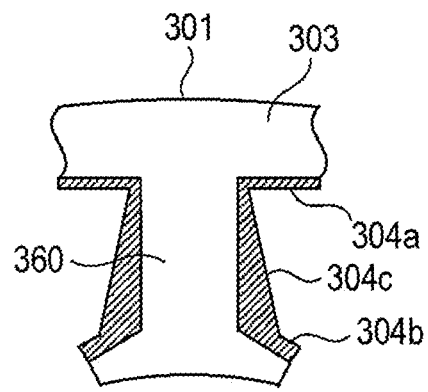

Next, FIGS. 3A and 3B illustrate another improvement example. As in FIGS. 2A and 2B, the reference numerals of members corresponding to FIGS. 1A and 1B are presented with numbers obtained by adding 200 to the numbers of the reference numerals of the members in FIGS. 1A and 1B. These reference numerals indicate correspondences between the members of both bobbins. FIGS. 3A and 3B particularly illustrate a cross-sectional view of the winding of a motor and an enlarged view thereof. As illustrated in FIG. 3A, a side surface inside thick lines H of a wire-wound insulator 306 is formed with projections and depressions, which prevents incorrect placement of the wires and improves wire alignment. Consequently, contact with an adjacent coil is prevented. Hence, even with a high fill factor, it is possible to manufacture a highly insulated stator.

In this structure, as illustrated in FIG. 3B, a slope is formed in such a manner as to increase the thickness of a tooth of a pole 360 from the outer peripheral side toward the inner peripheral side. Consequently, the wire is wound, sliding along the slope. Consequently, the formation of a gap between the wires due to clustering the wires on one of the outer and inner peripheral sides is prevented. In this manner, an improvement in the alignment of the wire arrangement is encouraged.

However, in the other improvement example in 3A, the width of the steps of the projections and depressions varies depending on the wire diameter as in the improvement example in FIGS. 2A and 2B. Hence, it is not possible to avoid problems similar to FIGS. 2A and 2B, such as an increase in the cost of a mold, due to variations in wire diameters.

FIG. 3B is described later.

Figure 4:
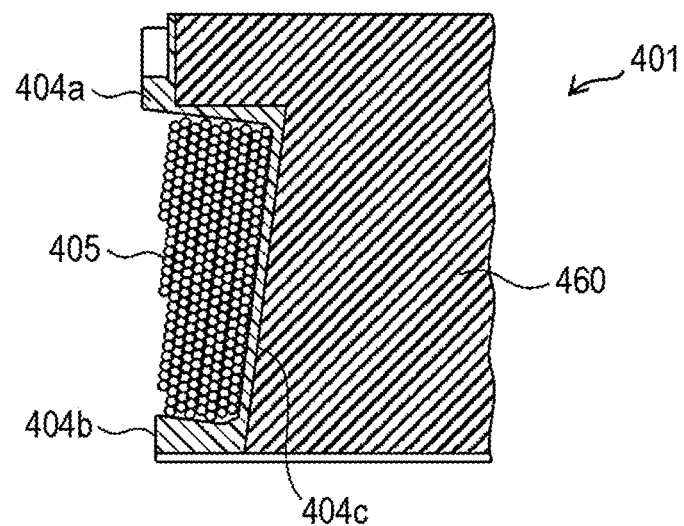
FIG. 4 is a diagram illustrating another example of the configuration of the bobbin, in which a slope that increases the width of a wire-wound pole from the outer peripheral side toward the inner peripheral side of the pole is formed (refer to Japanese Patent No. 4655764)

Next, an example of Japanese Patent No. 4655764 is presented. FIG. 4 is an enlarged cross-sectional view of a winding part of Japanese Patent No. 4655764 below.

As illustrated in FIG. 4, in the technology of Japanese Patent No. 4655764, an end surface (a winding portion end surface) of a pole 460 where a wire 405 is wound has a slope in such a manner to increase the width of the pole 460 from the outer peripheral side toward the inner peripheral side of the pole 460 as indicated by a reference numeral 404c. In addition, the technology has a feature that an inner diameter-side support portion 404b and an outer diameter-side support portion 404a each include a sloping surface that is square to the winding portion end surface. Consequently, when the wire 405 is wound along the slope of an end portion of a core 401, the surfaces of the support portions 404a and 404b that are square to the slope can prevent the collapse of the wires 405. The other improvement example of FIG. 3B and the example of FIG. 4 use common mechanisms that the wall surface of the bobbin is inclined relative to the side surface of an armature core, and that accordingly alignment in the wires placed up against one side improves. However, this technique has the following problems:

(1) Influence of Stress Concentration on One Side

For example, in the technique of FIG. 4, the wire 405 is wound along the slope indicated by the reference numeral 404c. Hence, wire stress is applied to the support portions 404a and 404b. As a result, a crack or a reduction in assemblability may occur due to warpage of the bobbin.

(2) Influence of Increase of Total Length Due to Increase in Height of Coil End

When the wire 405 is wound along the slope as in, for example, the technique in FIG. 4, a coil end portion on the inner diameter side increases in height (refer to the reference numeral 404a). The winding bulges due to the increase of the height of the coil end portion on the inner diameter side, which further causes an increase in the total length of the motor.

(3) Influence of Reduction in Fill Factor and Stress Cracking Due to Uneven Thickness There is a part having a greater thickness of the winding per number of turns due to the uneven thickness of the winding. Hence, the winding space compressed by the part leads to a reduction in the fill factor. Moreover, a crack may occur due to a difference in stress that is dependent on the position of the wire that has been wound.

Moreover, the slope of the outer diameter-side flange portion 404c produces a thinner place on the outer diameter-side flange portion 404c. In order to secure an insulation distance required for the place, it is necessary to increase the thickness of the entire outer diameter-side flange portion 404c. This thick outer diameter-side flange portion 404c compresses the winding space, which leads to a reduction in the fill factor. On the other hand, the thin outer diameter-side flange portion 404c brings about a reduction in strength. Hence, the occurrence of a crack or a reduction in assemblability due to the warpage of the bobbin is expected.

As described above, the technology that attempts to encourage an improvement in alignment with a sloping wall surface has the above-mentioned problems.

An object of the present disclosure is to improve wire alignment with a simpler motor armature winding structure.

According to an aspect of the present embodiment, there is provided a motor armature winding structure for winding an armature wire around a bobbin of a motor, wherein the armature winding structure includes a filleted portion including a curved surface, the filleted portion is formed on at least one of corner portions at four corners of a bobbin side wall surface where the wire is wound, and the curved surface has a curvature radius that decreases from a winding start position toward a winding end position in a first layer of the wires wound on the bobbin side wall surface.

In order to wind the wire, the filleted portion is provided. The magnitude of the radius of the curved surface of the filleted portion varies in the one direction of wire winding directions. With such a configuration, the wire is wound along the one direction. Therefore, wire alignment can be improved.

The curvature radius of the corner portion of the bobbin side wall surface may vary continuously on the filleted portion. Alternatively, the curvature radius may vary discontinuously.

Moreover, the bobbin side surface portion may be provided with an outer diameter-side flange portion provided on the outer peripheral side of an armature of the motor, and an inner diameter-side flange portion provided on the inner peripheral side of the armature of the motor.

Moreover, according to another aspect of the present embodiment, there is provided the motor armature winding structure further including a partial filleted portion including a partial curved surface, wherein the partial filleted portion is continuous to the filleted portion, and the partial curved surface has a curvature radius that increases from the winding start position toward the winding end position.

The variations in the curvature radius of the curved surface of the filleted portion may or may not be uniform.

In the fillet structure, the curvature radius of the curved surface varies in one direction, which improves wire alignment. At the same time, unbalanced stress on the bobbin can be mitigated. As a result, it is possible to achieve a high fill factor while securing customizability. Hence, it is possible to encourage an improvement in motor performance.

Moreover, a motor armature wire winding method according to the present embodiment is for winding an armature wire around a bobbin of a motor, and includes: providing a filleted portion including a curved surface, on at least one of corner portions at four corners of a bobbin side wall surface where the wire is wound; and winding the wires in a first layer around the bobbin sequentially from the large filleted portion with a short circumference toward the small filleted portion with a long circumference, and the curved surface has a curvature radius that decreases from a winding start position toward a winding end position in the first layer.

According to the present embodiment, in the motor armature winding structure, an edge of the corner portion of the surface of the bobbin where the wire is wound is rounded to provide a fillet, which mitigates unbalanced stress on the bobbin and prevents the loss of alignment of the wires. In this manner, wire alignment can be improved.

A motor armature winding structure according to embodiments of the present disclosure are described in detail hereinafter with reference to the drawings.

First Embodiment

Figure 5A:
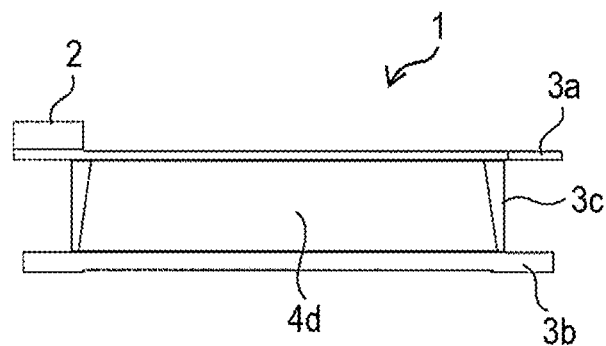
FIGS. 5A and 5B are diagrams illustrating an example of the configuration of a bobbin used for a motor armature winding structure according to a first embodiment of the present disclosure.
Figure 5B:
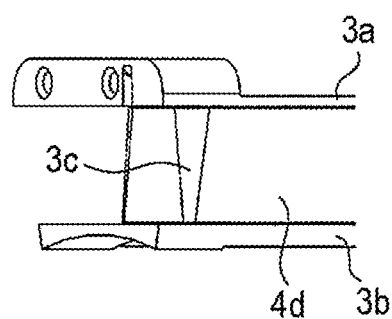
Figure 6A:
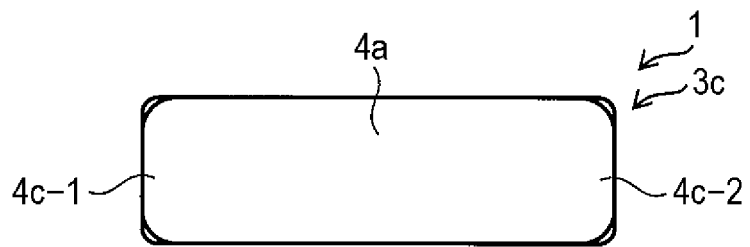
FIGS. 6A to 6C are six orthogonal views of the bobbin used in the first embodiment of the present disclosure.
Figure 6B:
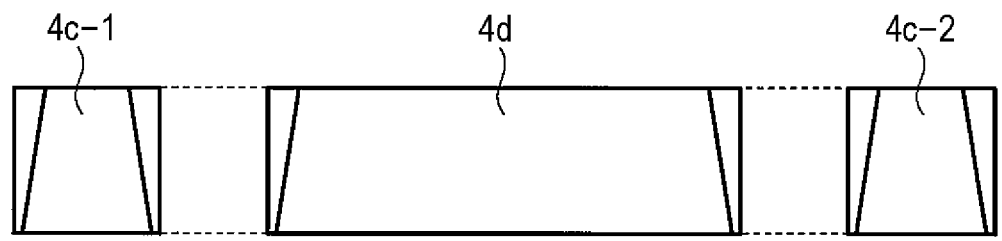
Figure 6C:
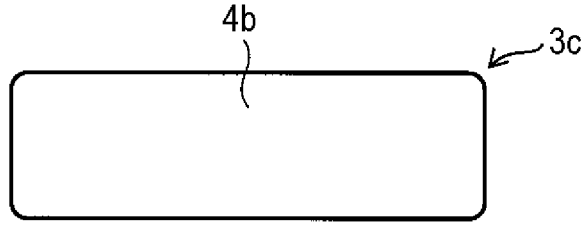
Figure 7A:
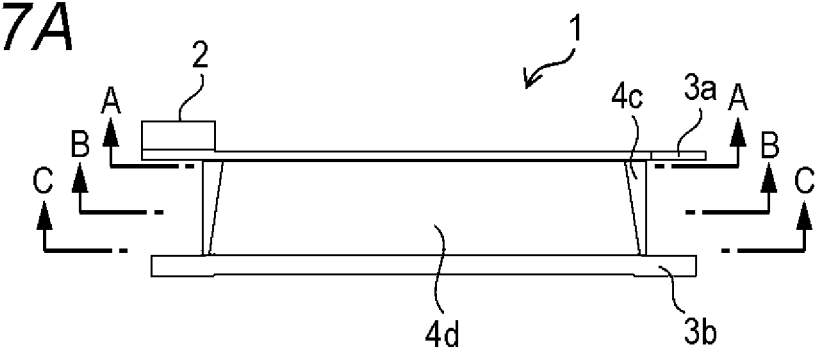
FIG. 7A is a diagram illustrating cutting positions on the bobbin used in the first embodiment of the present disclosure as viewed from the side.
Figure 7B:
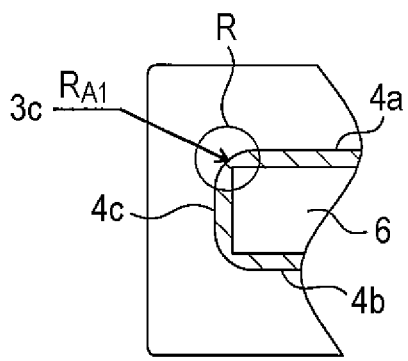
FIGS. 7B to 7D are diagrams illustrating a detailed structure of a fillet that is dependent on the cutting position.
Figure 7C:
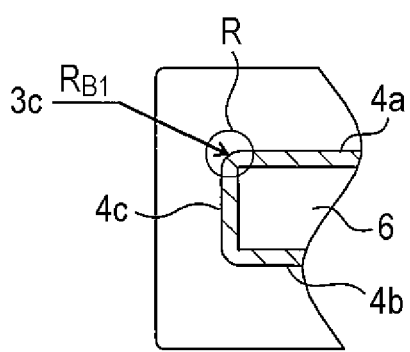
Figure 7D:
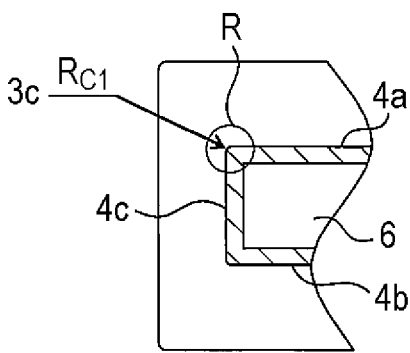
Figure 8A:
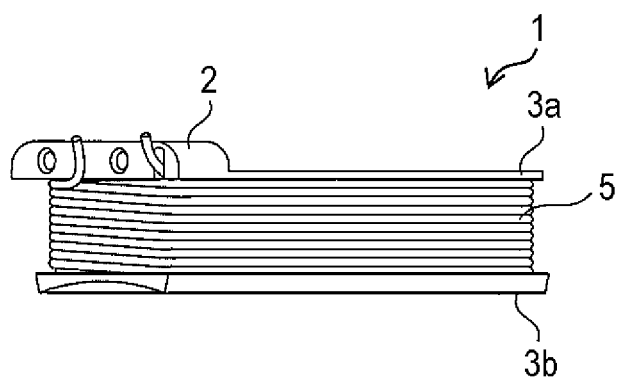
FIG. 8A is a diagram at the end of winding.
Figure 8B:
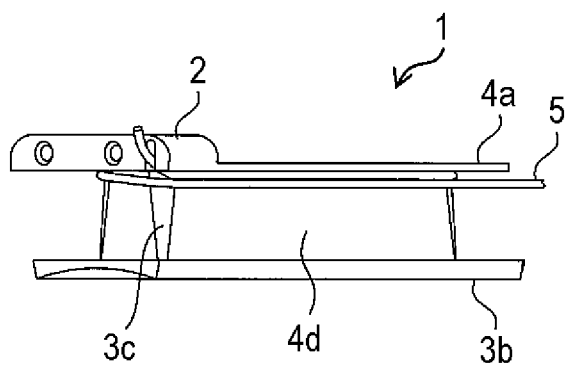
FIG. 8B is a diagram at the start of winding in a motor armature wire winding method according to the first embodiment of the present disclosure.

FIGS. 5A and 5B are diagrams illustrating an example of the configuration of a bobbin used for a motor armature winding structure according to the present embodiment. FIG. 5A is a side view of the bobbin. FIG. 5B is an enlarged perspective view of an end portion of the bobbin. FIGS. 6A to 6C are six orthogonal views of the bobbin. 6D is a perspective view of the whole bobbin. FIG. 7A is a diagram of the bobbin as viewed from the side. FIG. 7A is a diagram illustrating cutting positions of cross-sectional views of FIGS. 7B to 7D. FIGS. 7B to 7D are cross-sectional views illustrating a detailed structure of a filleted portion taken along cross section positions A, B, and C. FIG. 8A is a diagram illustrating a state at the end of winding. FIG. 8B is a diagram illustrating a state at the start of winding.

The general view of a bobbin 1 in FIG. 5A is substantially the same as the general view in FIG. 1A in terms of the external appearance.

However, as illustrated in FIG. 5A, and FIG. 5B that is an enlarged view of the end portion of FIG. 5A as viewed obliquely, a wall surface 4 of the bobbin 1 where a wire 5 is wound has an arc-shaped curved surface on a corner portion at each of four corners of the wall surface 4. On the corner portion of the wall surface 4 of the bobbin 1 where the wire is wound, a curvature radius R of the circumferential curved surface varies gradually from an upper surface portion 4a of the bobbin 1 on an outer diameter-side flange portion 3a (a first flange portion) side toward a bottom surface portion 4b of the bobbin 1 on an inner diameter-side flange portion 3b (a second flange portion) side. The corner portion having such a shape is referred to as a filleted portion 3c. The filleted portion 3c is formed to form a slope portion that slopes from the outer diameter-side flange portion 3a to the inner diameter-side flange portion 3b.

A reference numeral 4d indicates a side end surface of the bobbin 1. A detailed configuration of the filleted portion 3c is described below.

Figure 6D:
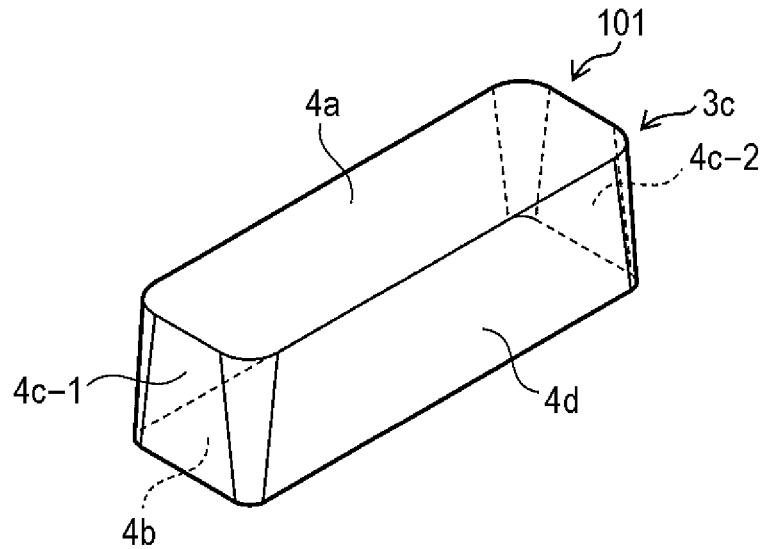
FIG. 6D is a perspective view.

FIGS. 6A to 6C are six orthogonal views of the bobbin 1. FIG. 6D is a perspective view of the bobbin 1. As illustrated in FIGS. 6A to 6D, in the bobbin structure according to the present embodiment, the filleted portion 3c is formed on the corner portion at each of the four corners of the wall surface where the wire 5 is wound. Consequently, as described below, the alignment of the wires 5 can be improved.

FIGS. 7A to 7D illustrate a detailed configuration example of the filleted portion 3c. FIG. 7A is a diagram illustrating the cutting positions on the bobbin 1 as viewed from the side. FIGS. 7B to 7D are cross-sectional views illustrating the detailed structure of the fillet, corresponding to the cutting positions illustrated in FIG. 7A. In the side view of FIG. 7A, FIGS. 7B to 7D illustrate cross-sectional shapes of the end portion along three cross sections including cross sections A-A, B-B, and C-C at different positions between the outer diameter-side flange portion 3a and the inner diameter-side flange portion 3b, respectively.

As illustrated in FIGS. 7B to 7D, the filleted portion 3c is provided to the corner portion at each of the four corners of the wall surface designed to wind the wire. The filleted portion 3c has an arc shape. In other words, the curvature radius of the corner portion of the side surface of the bobbin 1 decreases continuously from RA1 in the cross section A-A to RC1 in the cross section C-C (the magnitude of the curvature radius: RA1>RB1>RC1). In the example illustrated in FIGS. 7B to 7D, the curvature radius R on the circumference of the bobbin decreases gradually from the outer diameter-side flange portion 3a toward the inner diameter-side flange portion 3b.

In the first layer of the wires 5, the wire 5 is wound along the arc shape on the filleted portion 3c formed on the corner portion of each of the four corners of the bobbin 1. Hence, as the curvature radius of the arc shape of the corner portion decreases, the wire 5 is wound at a smaller bending angle. Moreover, the length of a single turn of the wire 5 that is wound on the side surface of the bobbin 1 is the shortest in the cross section A-A having an arc shape with the greatest curvature radius. On the other hand, the length is the longest in the cross section C-C having an arc shape with the least curvature radius. For description's sake, the filleted portion 3c having the curvature radius R on the circumference of the bobbin that varies gradually in this manner may be referred to below as the "variable radius filleted portion."

FIGS. 8A and 8B illustrate an example of the motor armature winding structure according to the present embodiment, which includes the wire 5 wound around the bobbin 1.

FIG. 8A illustrates the bobbin 1 around which the wire 5 has been wound. At the start of winding of the wires 5 in the first layer, the wire 5 is drawn in from the end portion of the bobbin 1. After the winding of several layers, the end of the wire 5 is pulled out from the final layer.

If the variation of the radius of the filleted portion 3c is appropriately set, the curvature radius of the filleted portion 3c on the coiner portion closest to the first turn of the wire 5 in the first layer of the wires 5 is the greatest curvature radius in the cross section A-A. As the distance from the cross section A-A increases, the curvature radius changes to the less curvature radius in the cross section B-B, and then to the least curvature radius in the cross section C-C.

In this manner, the filleted portion 3c has the curved surface that is formed on at least one of the corner portions at the four corners of the side wall surface of the bobbin 1 around which the wire 5 is wound. The curvature radius of the curved surface decreases from the winding start position toward the winding end position in the first layer of the wires 5 wound around the bobbin 1.

FIG. 8B illustrates a state of winding the first turn of the wire 5. As described above, the wire 5 that has been wound one turn around the bobbin 1, starting at the end of the bobbin 1, is illustrated. The wires 5 in the first layer are then wound sequentially from the large filleted portion 3c (FIG. 7B) with a shorter circumference toward the small filleted portion 3c (FIG. 7D) with a longer circumference.

At this point in time, a force that slides the wire 5 from the position of line C-C toward the position of line A-A in FIG. 7A occurs on the portion where on the bobbin 1 the wire 5 is wound. With the force that slides the wire 5, a force acts in a direction where the wire 5 moves toward one end of the bobbin 1 during the operation of winding the wire 5 as in a case where a slope is provided on the side surface of the bobbin as in FIG. 3B or 4. Hence, a gap is hardly created between the wires 5. As a result, the alignment of the wires 5 in the first to final layers improves. Therefore, it is possible to prevent the loss of alignment of the wires and improve wire alignment.

TABLE 1

| Case | Reference Example (FIG. 1) | Present Disclosure | Reference Example (FIG. 2) | Reference Example (FIGS. 3, 4) |
|---|---|---|---|---|
| External appearance (side view) | 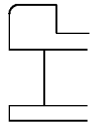 | 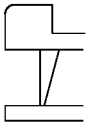 | 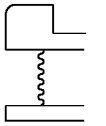 | 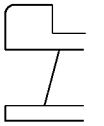 |
| Item | Normal Bobbin | Variable Radius Fillet | Grooved Bobbin | Taper (unevenly thickened bobbin) |
| Alignment due to relative displacement | Fair | Excellent | Excellent | Excellent |
| Customizability (different wire diameter) | Excellent | Excellent | Fair | Good |
| Space factor in core | Good | Excellent | Excellent | Fair |
| Stress of wire on bobbin | Excellent | Excellent | Excellent | Fair |

In Table 1, Reference Example 1 (FIG. 1) to Reference Example 4 (FIG. 4) are compared with the motor armature winding structure according to the present embodiment. The motor armature winding structure according to the present embodiment has the following advantageous effects, compared to Reference Examples.

(1) The motor armature winding structure according to the present embodiment can prevent the loss of alignment of the wires on the bobbin 1 as in Reference Example 2 (FIGS. 2A and 2B).

(2) In the motor armature winding structure according to the present embodiment, it is not necessary to form grooves that are adjusted to the diameter of the wire 5 in the side end surface of the bobbin 1 to prevent the loss of alignment of the wires on the bobbin 1, unlike Reference Example 2 (FIGS. 2A and 2B). Hence, various wires 5 can be wound around the same bobbin 1.

(3) In the motor armature winding structure according to the present embodiment, on the winding portion on only at least one of the corner portions at the four corners of the bobbin 1, the variable radius filleted portion 3c is eliminated and, instead, such a slope as illustrated in Reference Example 3 (FIGS. 3A and 3B) or Example 4 (FIG. 4) in Japanese Patent No. 4655764 is formed. Hence, stress acting on the flange portions (the reference numerals 3a and 3b in FIG. 5A) during winding is small. As a result, the wire can be wound without occurrence of problems such as warpage and cracks.

(4) In the motor armature winding structure according to the present embodiment, the thickness of the bobbin 1 that is provided in contact with a surface that defines a slot portion formed in the armature core is uniform except the corner portions of the bobbin 1. Hence, a part having a greater thickness created due to uneven thickness of the bobbin 1 does not compress the winding space. Hence, the wire 5 can be wound without reducing the fill factor of the winding 5.

(5) In the motor armature winding structure according to the present embodiment, the thickness of the bobbin is uniform except the corner portions. Hence, the wire 5 can be wound in such a manner as to prevent uneven thickness of the winding due to partial loss of alignment of the wires 5.

Second Embodiment

Figure 9A:
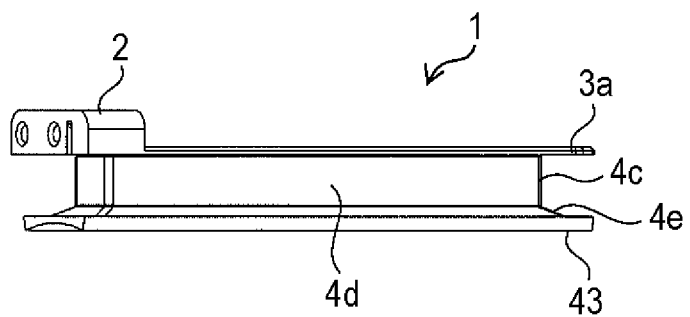
FIGS. 9A to 9D are diagrams illustrating a partially sloping bobbin and wires (a reference example)

FIGS. 9A to 9D are diagrams for explaining the motor armature winding structure of another reference example (FIG. 9A). FIGS. 10A to 10F are diagrams for explaining a motor armature winding structure according to a second embodiment of the present disclosure.

As illustrated in FIGS. 9A to 9D, a part of the winding portion of a bobbin described below is previously provided with a slope along a core.

Figure 9B:
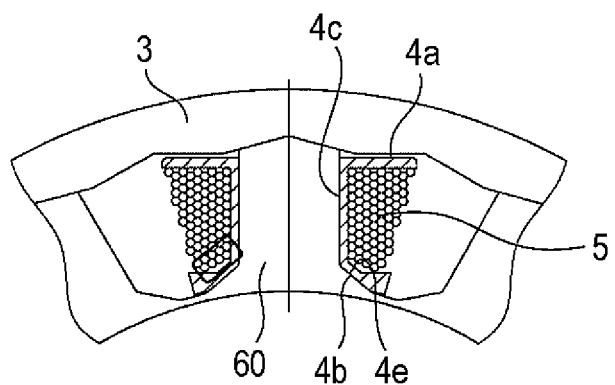

As the other reference example (FIGS. 9A and 9B), a partially sloping bobbin and wires 5 are illustrated. As illustrated in FIG. 9A, a partial slope portion 4e is formed in the motor armature winding structure of the other reference example (FIGS. 9A and 9B). The partial slope portion 4e includes a part of the bobbin 1, that is, a part of the side surface on the inner diameter side, that slopes. The partial slope portion 4e is not a slope that is provided to align the wires 5 up against one side as in Reference Example 3 (FIGS. 3A and 3B) and Reference Example 4 (FIG. 4). As illustrated in FIG. 9B, a slope may be provided along the side surface of the armature core, fitting to a slope at the tip of a pole. In many cases, a motor is designed with a shape that is open on the inner peripheral side of a pole 60 to cause magnetic flux on the armature side to effectively act on a rotor. From the viewpoint of the fill factor, the partial slope portion 4e that is provided to the bobbin 1 along the shape that is open on the inner peripheral side of the pole 60 is also widely used.

However, the partial slope portion 4e also becomes a cause of the loss of alignment of the wires 5 as in Reference Examples 1 to 4 mentioned above.

Figure 9C:
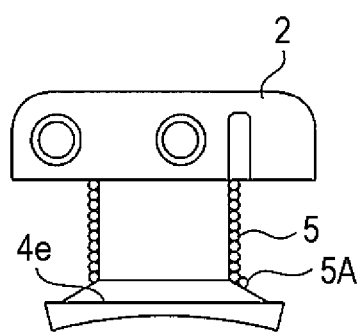

For example, a wire 5A of the first turn in the second layer is preferably placed between the wire 5 of the final turn in the first layer and a wall surface of the partial slope portion 40 as illustrated in FIG. 9C. The wire 5A is wound and then the winding layer is switched from the first to the second layer. Hence, a wire at a point a half turn back from the wire 5A in FIG. 9C is represented by a wire on the left side in FIG. 9C. In other words, the wire 5 is wound obliquely from a position indicated by a wire 5B to a position indicated by the wire 5A. Hence, a force that attempts to move the wire 5 in a shorter circumference direction (upward in the drawing) acts on the wire 5 due to tension during winding. In some cases, the wire 5A fits not at the above-mentioned predetermined position but between the wires in the first layer as illustrated by the wire 5B in FIG. 9D, which becomes a cause that the partial slope portion 4e causes wild winding.

Hence, in the second embodiment of the present disclosure, the same variable radius filleted portion 3c as that of the first embodiment is generally formed on a part continuous to a partial filleted portion 3e on the bobbin 1 that is provided with the partial slope portion 4e. Consequently, the above problem has been solved.

Figure 10A:
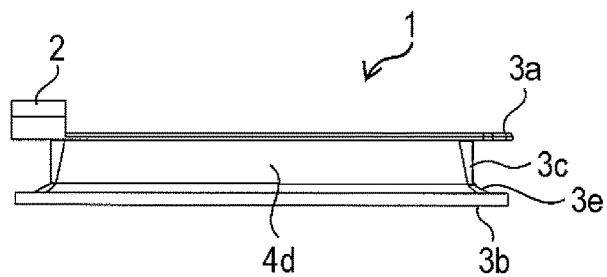
FIGS. 10A to 10F are diagrams illustrating an example of the configuration of a bobbin used for a motor armature winding structure according to a second embodiment of the present disclosure.
Figure 10B:
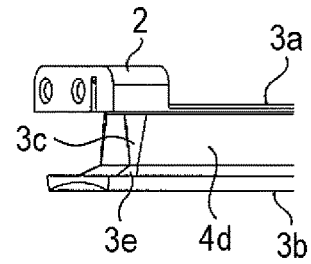

FIGS. 10A to 10F are diagrams illustrating an example of a combination of the partial filleted portion 3e and the filleted portion (variable radius filleted portion) 3c of the first embodiment, as the second embodiment of the present disclosure. FIG. 10A is a general view. FIG. 10B is an enlarged view of an end portion.

Figure 10C:
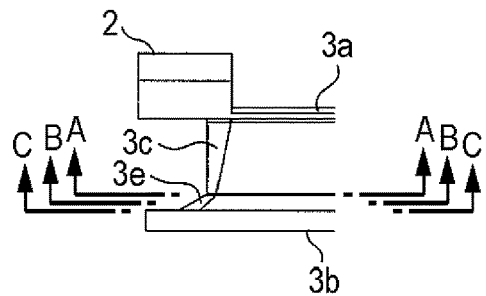
Figure 10D:
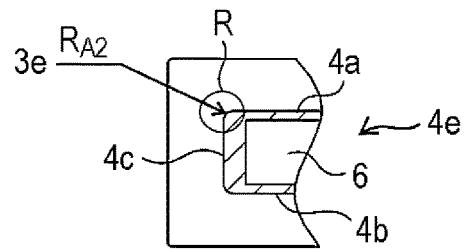
Figure 10E:
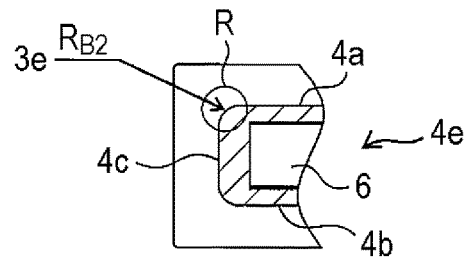
Figure 10F:
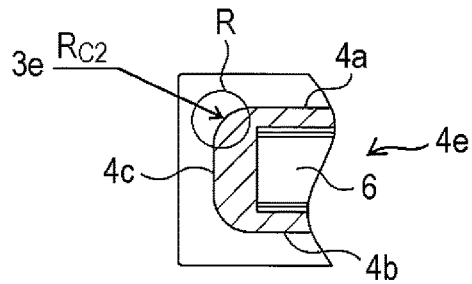

However, as the shape of the partial filleted portion 3e is viewed in cross section in FIG. 10C, the curvature radius R of the curved surface (arc) of the corner portion varies in such a manner as to gradually increase toward the bottom surface side as illustrated in FIGS. 10D to 10F. This indicates a tendency opposite to the variation of the curvature radius from the outer diameter-side flange portion 3a toward the inner diameter-side flange portion 3b of the filleted portion 3c in FIGS. 7A to 7D.

In other words, strictly speaking, in a case of the bobbin 1 in the first embodiment, the corner portion of the bobbin wall surface that extends in the vertical direction includes a fillet having a curvature radius that increasingly increases with increasing distance from the second flange portion 3b, compared with the curvature radius of the first turn of the wire, as in FIGS. 7A to 7D. In contrast, as a feature of the bobbin 1 in the second embodiment, a fillet that has a greater curvature radius as the distance from the second flange portion 3b, that is, the first turn of the wire increases is applied to the partial filleted portion 3e.

In terms of the tendency of the variation of the curvature radius of the curved surface (partial curved surface) of the corner portion, the fillet that is applied to the partial filleted portion 3e has a tendency opposite to the fillet of the variable radius filleted portion 3c of the first embodiment. The reason for this is described below, referring to the mechanism.

As mentioned above with reference to FIGS. 9C and 9D, in the reference example, the force pointing upward in the drawing acts on the wire of the part where the first and second layers are switched. Hence, the wire 5A tends to move to the position of the wire 5B.

Hence, as illustrated in FIG. 10C, the direction in which the curvature radius R of the partial curved surface (arc) of the corner portion of the partial filleted portion 3e varies in such a manner as to increase is set in a direction from the outer diameter-side flange portion 3a to the inner diameter-side flange portion 3b (downward in the drawing). This setting mitigates the force acting on the wire of the switching part.

Figure 9D:
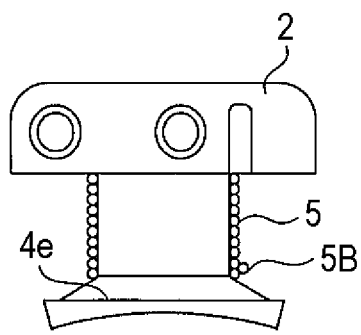

The reason for this is because the curvature radius of the partial filleted portion 3e increases toward the bottom surface ((downward in the drawing) as illustrated in FIGS. 10D to 10F. FIGS. 10D to 10F are cross-sectional views illustrating a detailed structure of the filleted portion at cross section positions A, B, and C illustrated in FIG. 10C. The filleted portion 3e is applied in such a manner as to have a greater curvature radius on a cross section having a longer circumference, which allows reducing the longer circumference. In other words, a relative difference between one half of a circumference where the wire 5B in FIG. 9D is placed and one half of a circumference where the wire 5A is placed is further reduced. Consequently, the force acting on the wire in a direction from the inner diameter-side flange portion 3b to the outer diameter-side flange portion 3a (from down to up in the drawing) is reduced. Hence, it is possible to prevent the position of the wire of the first turn from shifting in the direction from the inner diameter-side flange portion 3b to the outer diameter-side flange portion 3a in the second layer of the wires.

As described above in the specific modes, in the motor armature winding structure according to the embodiments, the filleted portion having the arc-shaped curved surface is provided to at least one of the corner portions at the four corners of the bobbin side wall surface where the wire is wound. Therefore, wire alignment improves. In addition, unbalanced stress on the bobbin or insulator is mitigated. Customizability is secured. Furthermore, a high winding fill factor can be achieved. Consequently, an improvement in motor performance can be encouraged. If a gist thereof can be concretized, the present disclosure is not limited to the above embodiments, and can be modified into other desirable embodiments without changing the gist of the embodiments.

The winding structure according to the embodiments can be used as a motor armature winding structure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor armature winding structure for winding an armature wire around a bobbin of a motor, wherein
the armature winding structure comprises a filleted portion including a first curved surface, and a partial filleted portion including a second curved surface, the partial filleted portion is provided on a partial slope portion of the bobbin,
the filleted portion and the partial filleted portion are formed on at least one of corner portions at four corners of a bobbin side wall surface where the wire is wound,
the filleted portion is provided on an outer peripheral side of an armature of the motor,
the partial filleted portion is provided on an inner peripheral side of the armature of the motor,
the partial filleted portion is continuous to the filleted portion,
the first curved surface has a curvature radius that decreases from the outer peripheral side of the armature of the motor toward the inner peripheral side of the armature of the motor, and
the second curved surface has a curvature radius that increases from the outer peripheral side of the armature of the motor toward the inner peripheral side of the armature of the motor.

2. The motor armature winding structure according to claim 1, wherein the curvature radius varies continuously.

3. The motor armature winding structure according to claim 1, wherein
the bobbin side wall surface includes an outer diameter-side flange portion and an inner diameter-side flange portion,
the outer diameter-side flange portion is provided on the outer peripheral side of the armature of the motor, and
the inner diameter-side flange portion is provided on the inner peripheral side of the armature of the motor.

4. A motor armature wire winding method for winding an armature wire around a bobbin of a motor, comprising:

Providing a filleted portion including a first curved surface and a partial filleted portion including a second curved surface, on at least one of corner portions at four corners of a bobbin side wall surface where the wire is wound; and winding the wires in a first layer around the bobbin sequentially from the large filleted portion with a short circumference toward the small filleted portion with a long circumference, wherein the partial filleted portion is provided on a partial slope portion of the bobbin, the filleted portion is provided on an outer peripheral side of an armature of the motor, the partial filleted portion is provided on an inner peripheral side of the armature of the motor, the partial filleted portion is continuous to the filleted portion, the first curved surface has a curvature radius that decreases from the outer peripheral side of the armature of the motor toward the inner peripheral side of the armature of the motor, and the second curved surface has a curvature radius that increases from the outer peripheral side of the armature of the motor toward the inner peripheral side of the armature of the motor.

* * * * *